(12) United States Patent
Patzel et al.

(10) Patent No.: US 6,516,013 B1
(45) Date of Patent: Feb. 4, 2003

(54) LASER BEAM MONITORING APPARATUS AND METHOD

(75) Inventors: Rainer Patzel, Dransfeld (DE); Uwe Stamm, Goettingen (DE)

(73) Assignee: Lambda Physik AG, Goettingen (DE)

( * ) Notice: Subject to any disclaimer, the term of this patent is extended or adjusted under 35 U.S.C. 154(b) by 23 days.

(21) Appl. No.: 09/741,465

(22) Filed: Dec. 18, 2000

Related U.S. Application Data
(60) Provisional application No. 60/172,749, filed on Dec. 20, 1999.

(51) Int. Cl.[7] .................................................. H01S 3/13
(52) U.S. Cl. ............................. 372/29.02; 372/29.011; 372/29.01; 372/29.014; 372/29.021
(58) Field of Search ......................... 372/29.02, 29.021, 372/29.011, 29.014, 29.01

(56) References Cited

U.S. PATENT DOCUMENTS

| | | | |
|---|---|---|---|
| 3,806,829 A | 4/1974 | Duston et al. .............. 331/94.5 |
| 4,393,505 A | 7/1983 | Fahlen ......................... 372/57 |
| 4,611,270 A | 9/1986 | Klauminzer et al. ........ 364/183 |
| 4,905,243 A | 2/1990 | Lokai et al. .................. 372/32 |
| 4,977,563 A | 12/1990 | Nakatani et al. .............. 372/32 |
| 5,247,531 A | 9/1993 | Mueller-Horsche .......... 372/38 |
| 5,396,514 A | 3/1995 | Voss ............................. 372/57 |
| 5,761,236 A | 6/1998 | Kleinschmidt et al. ..... 372/100 |
| 5,844,727 A | 12/1998 | Partlo ......................... 359/710 |
| 5,946,337 A | 8/1999 | Govorkov et al. ............ 372/92 |
| 6,084,897 A | 7/2000 | Wakabayashi et al. ........ 372/38 |
| 6,141,081 A | 10/2000 | Das et al. ..................... 355/53 |
| 2001/0012309 A1 * | 8/2001 | Albrecht et al. .............. 372/55 |

* cited by examiner

*Primary Examiner*—Paul Ip
*Assistant Examiner*—Armando Rodriguez
(74) *Attorney, Agent, or Firm*—Sierrra Patent Group, Ltd.; Andrew V. Smith

(57) ABSTRACT

An energy stabilization method and system includes an energy detector and simulating optics before the detector for forming a diagnostic portion of an output beam to simulate the beam profile of the working beam incident at the workpiece. Preferably, the simulating optics before the detector are selected to be identical or similar to beam transforming optics that the working beam traverses after the diagnostic portion is split off from the working beam, but before the working beam reaches the workpiece. The diagnostic beam portion is thus formed to have an identical or similar beam profile as the working beam at the workpiece. Alternatively, instead of providing transforming optics along the diagnostic beam path that are the same or similar to those encountered by the working beam, a processor configures the data received at the detector to simulate the beam profile of the working beam at the workpiece, after it traverses the transforming optics described above. The invention has the advantage that the energy in that part of the spatial profile of the working beam which is going to be used for application is stabilized. Particular advantage is achieved when the transforming optics include an aperture or lens or lens array aperture.

26 Claims, 5 Drawing Sheets

LASER BEAM MONITORING APPARATUS AND METHOD

This application claims the benefit of priority to U.S. provisional patent application No. 60/172,749, filed Dec. 20, 1999, entitled: LASER BEAM MONITORING APPARATUS AND METHOD.

FIELD OF THE INVENTION

The invention relates to excimer and molecular fluorine lasers, and particularly to an apparatus and method for monitoring the energy of output laser pulses in a feedback arrangement and providing enhanced energy stability.

DISCUSSION OF THE RELATED ART

For many industrial and laboratory applications, excimer lasers are used in an operating mode wherein active stabilization of the output power of the laser is important. The active stabilization of the output energy of excimer lasers typically involves an energy detector indirectly connected to a control component of the high voltage drive for the discharge in the laser tube and, accordingly, actively adjusting the drive voltage to stabilize the output energy. This is possible because, as the output energy or output power of the excimer laser is selected to be maintained in a certain range, it is known that this output energy value depends upon the input high voltage drive, as is illustrated at FIG. 1. Thus, a variation of output energy may be compensated by adjusting the high voltage drive. See U.S. patent application Ser. Nos. 09/379,034, 60/123,928 and 60/124,785 (describing techniques for compensating output energy variation based on halogen depletion including gas replenishment, as well as high voltage adjustments over limited voltage ranges), each of which is assigned to the same assignee as the present invention and which is hereby incorporated by reference into the present application.

The present invention relates to the field of industrial excimer and molecular fluorine lasers and the application of these lasers in optical lithography, annealing, micro machining, and others. Excimer lasers used for these applications are mainly XeCl lasers (308 nm), KrF lasers (248 nm), and ArF lasers (193 mn). Molecular fluorine (F2) lasers (157 nm) are also used as well.

In these applications, optical imaging systems are used in combination with the laser. These imaging systems usually transform the output beam of the laser prior to illumination of a mask with the transformed laser beam. The mask is than imaged to the sample (wafer, workpiece) to form the desired light pattern for exposure.

A clear aperture is typically used in the optical imaging system causing the spatial beam size of the incident laser beam to be smaller after the aperture. The aperture improves homogeneity of illumination at the sample, as well as changes or varies the laser beam size, profile and/or divergence over the gas, laser tube, or other component lifetimes. For any particular application and a given sample or workpiece to be processed, the illumination energy density at the workpiece has been determined during process development or is determined with some calibration routines before or during processing.

For processing, the excimer or molecular fluorine laser is operated in an energy-stabilized or power-stabilized mode. An internal energy or power meter measures the output energy/power of the laser. A feedback circuit compares the actual energy/power with a desired, preset value. The high voltage from the laser power supply is set accordingly to an appropriate higher or lower value, depending on the result of the comparison. The internal energy/power meter module is usually designed to measure the total energy in the beam, and thus typically averages the spatial inhomogeneities of the beam profile (i.e., the spatial distribution of energy in the laser beam).

Typically, as illustrated at FIG. 2, a beam splitter 2 external to the laser resonator reflects a diagnostic beam portion 3 of the laser output beam 4 to the energy detector 6, e.g., a photodiode, photomultiplier tube, CCD array, PSD, pyroelectric sensor, etc. A working beam portion 8 of the output beam traverses the beam splitter 2 as it proceeds towards a workpiece. The energy detector 6 then integrates the energy or power of the entire diagnostic beam portion 3 split off by the beam splitter 2 to provide a measure for the total output energy or power of the working beam portion 8.

For industrial applications such as microlithography or TFT annealing, the excimer laser beam profile of the output beam at the workpiece/wafer will typically differ from the profile of the output beam at the point that it impinges upon the beam splitter. As illustrated at FIG. 3A, an optical component such as the input aperture 10 of an illumination system including a collimating lens 12 may be positioned along the optical path of the working beam portion 8 to produce a collimated beam 14 and to provide a selected beam profile.

FIG. 3B illustrates the beam profile 16 of the working excimer laser beam 8 before it traverses the lens aperture combination 12/10 of FIG. 3A. FIG. 3C illustrates the beam profile 18 of the collimated beam 14 that results from the working beam 8 traversing the lens aperture combination 12/10. The spatial homogeneity of the collimated beam 14 after the aperture 10 is improved over that of the beam 8 incident at the aperture 10. Referring back to FIG. 3A, the collimated beam 14 whose profile is shown at FIG. 3C then continues along the beam path towards beam shaping optics 20. Therefore, that portion of the energy of the incident beam 8 which is cut off at the aperture 10 never reaches the workpiece, and it is at the workpiece that the value of the energy dose is significant. Moreover, that portion of the incident beam that is not cut off at the aperture 10 and does traverse the lens 12 will undergo some induced absorption by the material of the lens 12, further differentiating the apertured and focused beam 14 from the incident beam 8.

FIGS. 4A–4B show alternative conventional optical arrangements 20 and 22, respectively, that the diagnostic beam portion 3 traverses before reaching the energy detector 6. The optical arrangement 20 of FIG. 4A includes an attenuator 24 for reducing the magnitude of the laser energy that will ultimately impinge upon the detector 6 in order to protect the detector 6, and a pair of diffuser plates 26, 28 disposed before the detector 6. As shown, the beam is so diffused after the second diffuser 28 that some fraction of beam energy escapes around the outside dimensions of the detector 6 and is not included in the measurement of the energy of the beam 3.

The optical arrangement 22 shown in FIG. 4B includes an attenuator 30 and a converging lens 32. In contrast with the arrangement shown at FIG. 4A, there is no portion of the beam 3 that is diffused outside of the dimensions of the detector 6. Some induced absorption, however, will occur at the lens 32 so the detector 6 will basically measure the energy of the split off beam portion 3 multiplied by the attenuation fraction of the attenuator 30, minus the induced absorption at the lens 32.

It is recognized that the measured energies at the detector 6 after the beam 3 traverses either of the arrangements 20, 22 shown in FIGS. 4A and 4B, respectively, are inaccurate measures of the actual energy dose that is incident at the workpiece. Further, the beam profile at the detector 6 does not match the beam profile incident at the work piece. For example, referring to FIG. 3A, the effects of blocking the outer portion of beam 8 by the aperture 10 and the induced absorption by the lens 12 are not measured by the detector 6 in conventional energy monitoring configurations. It is also recognized that it is the energy delivered to the workpiece, and not the energy of the beam 8 just after the beam 4 traverses the beam splitter 2, that should be stabilized by the feedback arrangement. Thus, it is desired to have an energy monitoring apparatus that achieves a more accurate measure of the energy and profile of the beam that is incident at the workpiece, so that the energy stability of the portion of the beam that is applied to the workpiece may be improved.

SUMMARY OF THE INVENTION

It is an object of the invention to provide an energy stabilization system for a working beam of an excimer or molecular fluorine laser wherein the energy of the beam at a workpiece exhibits improved energy stability.

It is a further object of the invention to provide an energy stabilization system for an excimer or molecular fluorine laser used for applications in which only a part of the spatial profile of the output beam from the laser resonator is applied to the workpiece.

In accord with the above objects, the present invention provides a laser system that includes a gain medium disposed in a resonant cavity, a power supply for exciting the gain medium to produce an output beam, beam splitting means for creating a primary output beam and a diagnostic beam from the output beam, beam transforming means for inducing a first beam parameter transformation in the primary output beam, beam simulation means for inducing a second beam parameter transformation in the diagnostic beam, and a detector for measuring at least one of a plurality of beam parameters of the diagnostic beam after the second beam parameter transformation is induced. The first beam parameter transformation induced in the primary output beam is substantially the same as the second beam parameter transformation induced in the diagnostic beam.

In another aspect of the present invention, the laser system includes a gain medium disposed in a resonant cavity, a power supply for exciting the gain medium to produce an output beam, beam splitting means for creating a primary output beam and a diagnostic beam from the output beam, beam transforming means for inducing a beam parameter transformation in the primary output beam, a detector for measuring at least one of a plurality of beam parameters of the diagnostic beam, and for producing a signal in response to the measured at least one beam parameter, and a processor for modifying the signal to simulate an inducement of the beam parameter transformation in the diagnostic beam.

The invention has the advantage that the energy in that part of the spatial profile of the working beam which is going to be used for application is stabilized. This is specifically advantageous for optical imaging systems where lens apertures in the optical system are "overfilled" by the beam (see FIG. 3A). The detector and feedback systems are in a preferred embodiment of the invention fast enough to compensate for variations of the energy/power density in the spatial part of the beam profile which is transmitted through the optical imaging system on a time scale between consecutive laser pulses.

DETAILED DESCRIPTION OF THE PREFFERED EMBODIMENT

Figure 5:
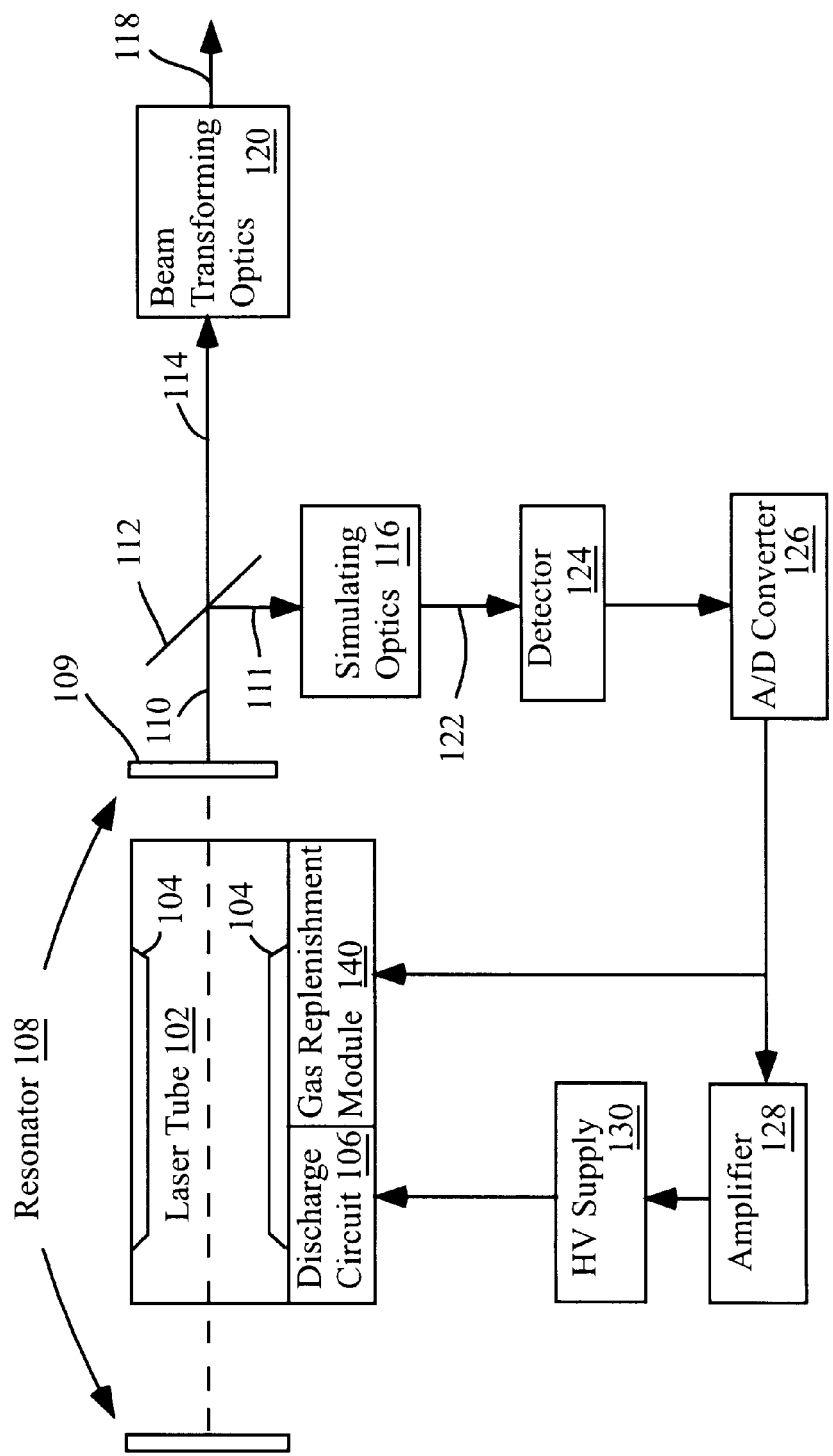
FIG. 5 schematically shows a preferred embodiment of an energy stabilization system of an excimer or molecular fluorine laser system in accord with the present invention.

FIG. 5 schematically shows a preferred embodiment of an energy stabilization system of an excimer or molecular fluorine laser system in accord with the present invention. The laser system includes a laser tube 102 filled with a gas mixture and including a pair of main electrodes 104 and one or more preionization electrodes (not shown) connected to a discharge circuit 106 for energizing the gas mixture. The laser tube is surrounded by a resonator 108, wherein typically a line narrowing, tuning and/or selection module (not shown) and divergence matching optics (not shown) are within the resonator 108. A wavelength calibration module (not shown) is also used. Preferred tube designs, electrodes, discharge circuit, line narrowing optics, tuning and/or selection module with wavelength and/or bandwidth detection and calibration means, and gas supply unit are described in U.S. patent application Ser. No. 09/379,034, 60/124,785, 60/128,227, 09/247,887, 08/842,578, 08/822,451, 09/390, 146, 09/317,695, 09/317,527, 09/271,020, 60/138,409, 60/123,928, 09/130,277, 60/167,835, 60/166,967, 60/166, 854, 60/162,227, 60/127,062, 60/149,392, 60/147,219, 60/166,952, 60/127,237, 60/162,735 and 09/136,275 and U.S. Pat. Nos. 5,396,514, 4,977,573, 5,247,531, 4,393,505, 5,761,236, 5,946,337 and 4,905,243, each of which is assigned to the same assignee as the present application and which is hereby incorporated by reference into the present application.

A laser beam 110 exits from the resonator 108 either through a partially transmissive resonator reflector 109 (as shown), or by intra-resonator output coupling by reflection from an optical surface such as a beam splitter or a surface of a prism or an angled window or etalon. The exiting beam encounters a beam splitter 112 that separates a diagnostic portion 111 from the beam 110, as shown in FIG. 5. The remainder of the beam 110 not separated by the beam splitter 112 is the output beam 114 of the laser system.

In accord with the present invention, the diagnostic beam 111 then encounters simulating optics 116. The simulating optics 116 transform the diagnostic beam 111 into a transformed diagnostic beam 122 which has a beam profile that closely resembles that of a transformed output beam 118, which results from beam transforming optics 120 that transform output beam 114 in accord with the specifications of the industrial application for which the beam 118 is to be used. Preferably, the simulating optics 116 are the same as the beam transforming optics 120, so that the beam profiles of the transformed output beam 118 and the transformed diagnostic beam 122 are the same.

Figure 1:
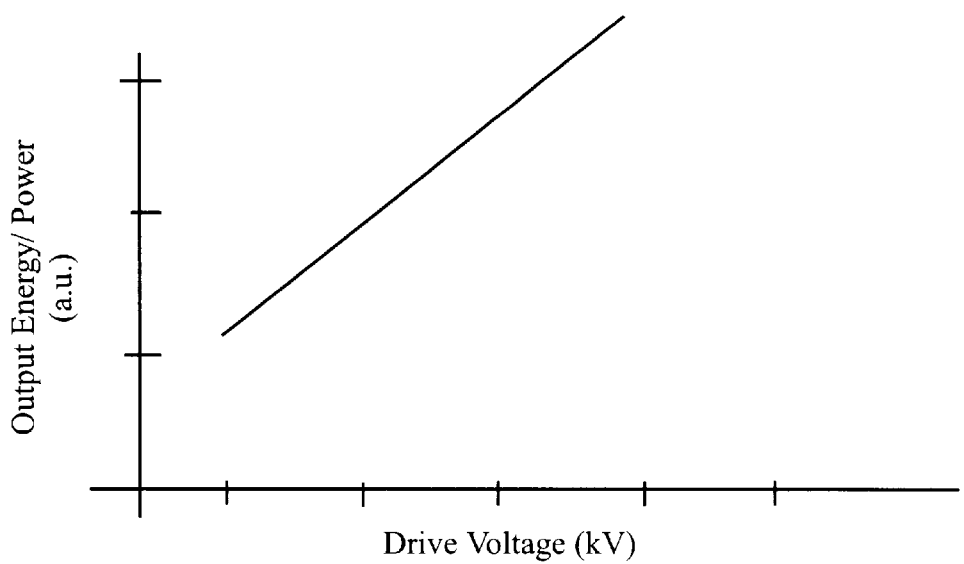
FIG. 1 shows a graph of output beam energy versus input driving voltage for an excimer or molecular fluorine laser system.
Figure 2:
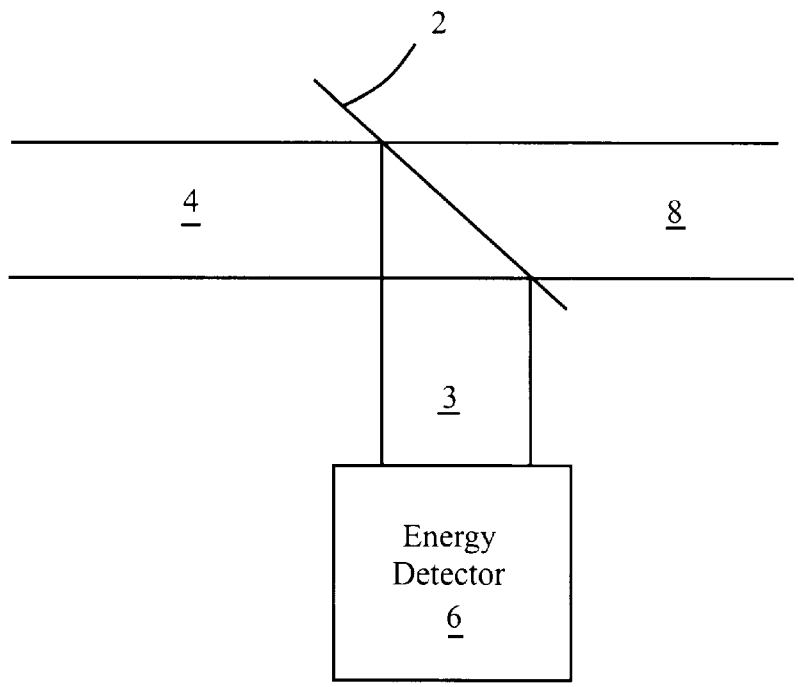
FIG. 2 illustrates a diagnostic or monitored beam portion being separated from a laser output beam using a beam splitter.
Figure 3A:
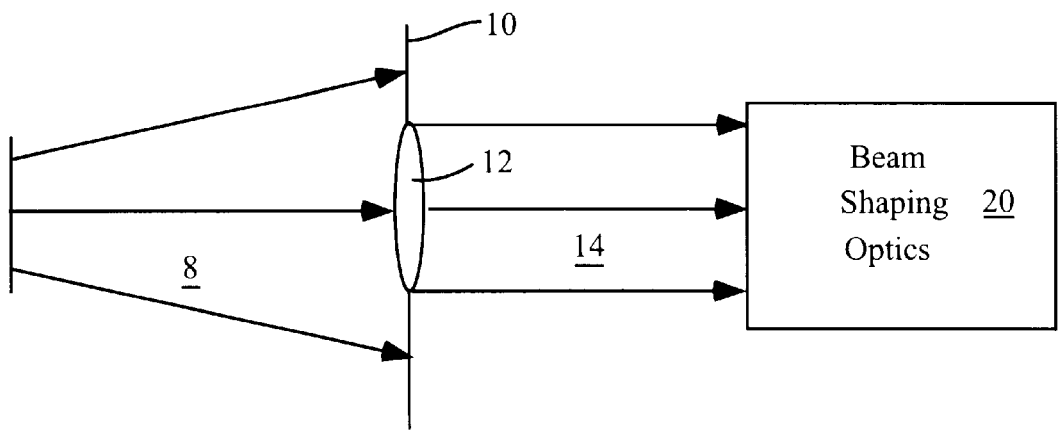
FIG. 3A illustrates an excimer or molecular fluorine laser beam traversing an input aperture and lens.
Figure 3B:
FIG. 3B illustrates a beam profile for the laser beam of FIG. 3A before the beam encounters the input aperture and lens.
Figure 3C:
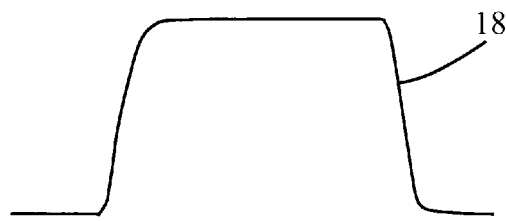
FIG. 3C illustrates a beam profile of the laser beam of FIG. 3A after the beam traverses the input aperture and lens.
Figure 4A:
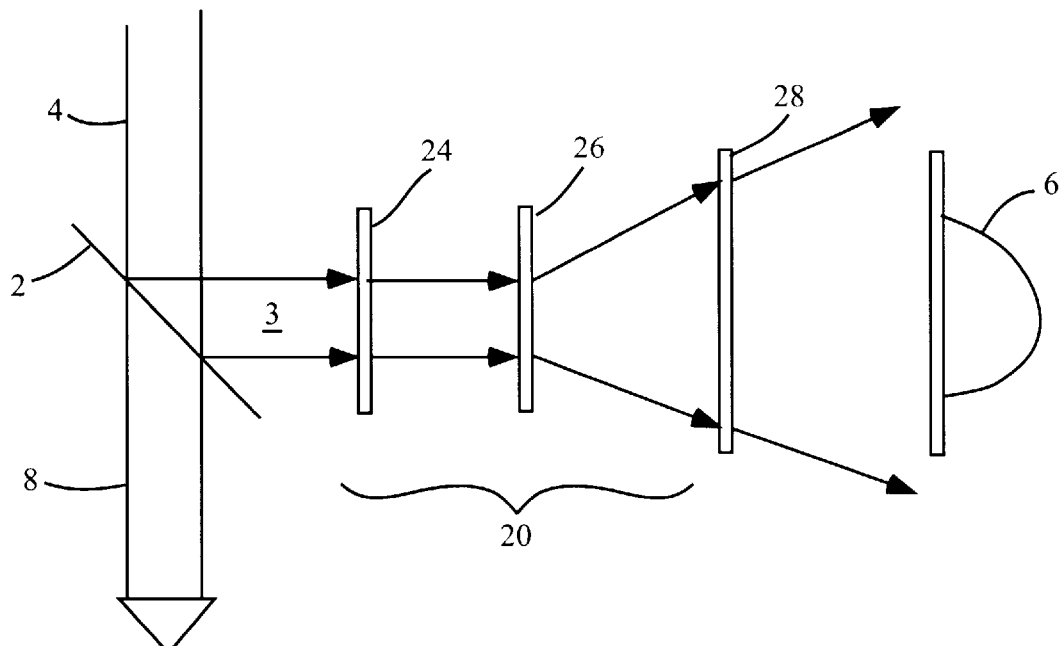
FIG. 4A illustrates a first conventional optical arrangement for a diagnostic beam portion before the beam reaches a detector.
Figure 4B:
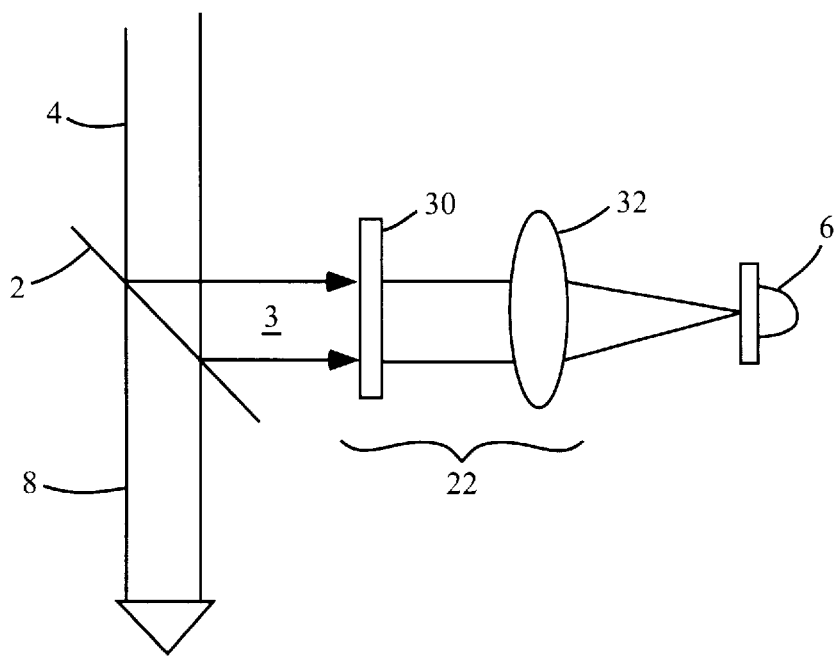
FIG. 4B illustrates a second conventional optical arrangement for a diagnostic beam portion before the beam reaches a detector.

The simulating optics 116 may include an aperture or lens aperture arrangement such as that shown in FIG. 3A. If the beam transforming optics 120 include such a lens aperture arrangement as that shown at FIG. 3A, then the simulating optics would also include such a lens aperture. The material and curvatures of the surfaces of the lenses of the transforming optics 120 and the simulating optics 116 would be the same or closely matched. The size of the apertures of each of the optics 116 and 120 would also be the same. If the lens aperture of the transforming optics 120 includes an array of lenses (typically cylindrical lenses), e.g., such as are described at U.S. Pat. No. 5,844,727, then the simulating optics 116 also include a similar array.

Under the present invention, the transformed diagnostic beam portion 122 more closely resembles the transformed output beam 118 which will ultimately be used for industrial application at the workpiece. One significant characteristic of lens apertures found in typical beam transforming optics 120 is that induced absorption occurs within the material of the lens(es). This induced absorption is a nonlinear effect which thus varies in percentage terms over the beam profile. Thus, a simple multiplicative factor will not exactly represent the induced absorption at various points along the beam profile. However, the lens(es) used in the simulating optics 116 of the present invention will exactly match the induced absorption of the beam transforming optics 120.

A detector 124 receives the transformed diagnostic beam 122 and preferably measures its energy. An attenuator (not shown) can be used to limit the intensity of energy incident upon the detector 124. As described above, the energy measured at the detector 124 is an improved measure of the energy of the transformed output beam 118 than is conventionally measured. An A/D converter 126 receives an output from the detector 124, and sends a signal to an amplifier 128 which outputs a HV driving or operating voltage control input signal to a power or HV supply 130.

The value of the HV output of the HV supply 130 is based on the signal received from the amplifier 128 which depends on the energy measured at the detector 124. This HV output is received by and determines the power supplied to the discharge circuit 106, and ultimately the energy of the output and diagnostic beams 110, 111, 114, 118 and 122. This feedback arrangement allows for accurate control of the energy of the transformed output beam 118, which contains the significant amount of energy in the system. Although not shown, a processor is preferably used to generally control the laser system and its component modules.

Figure 6:
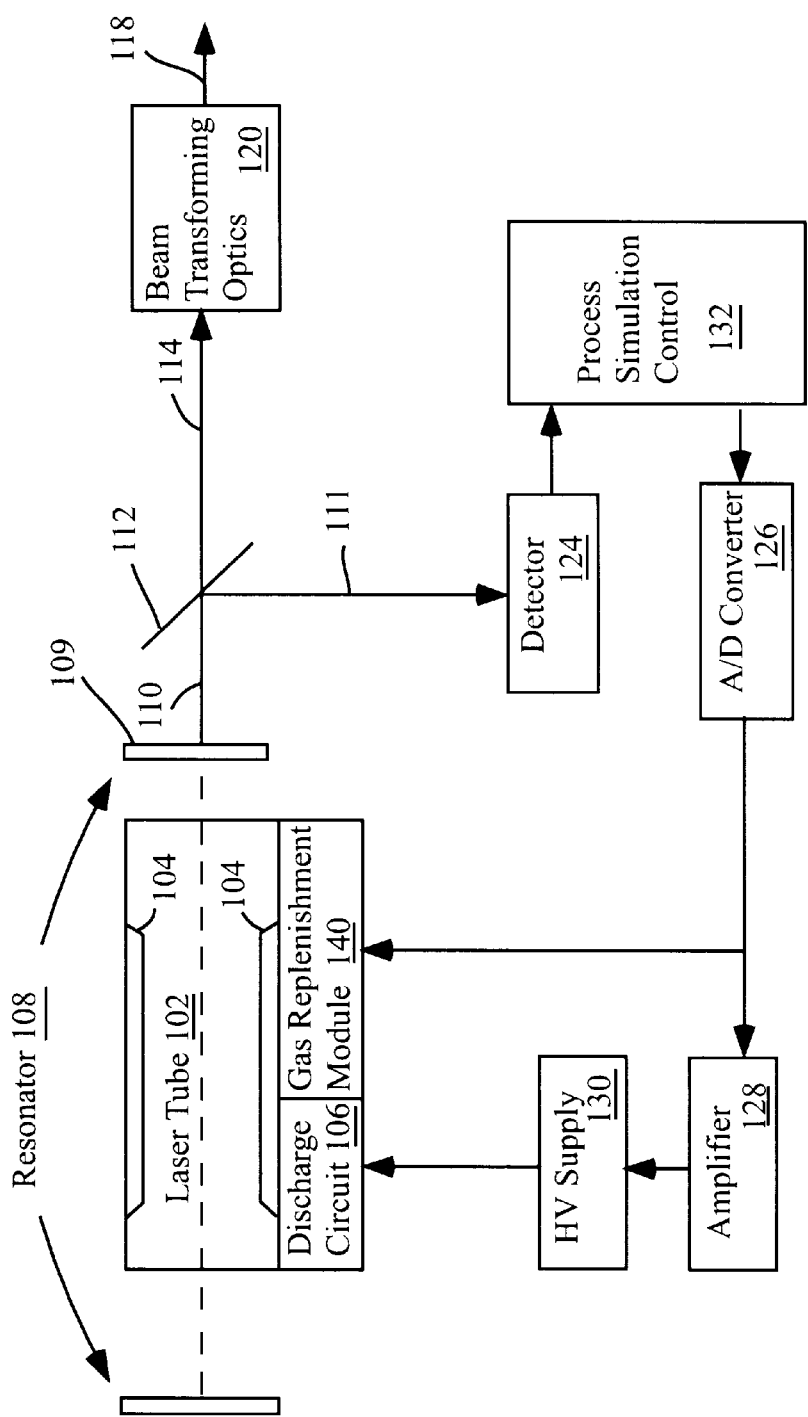
FIG. 6 illustrates an alternative embodiment of an energy stabilization system in accord with the present invention.

FIG. 6 illustrates an alternative embodiment of an energy stabilization system in accord with the present invention. The system of FIG. 6 is similar to that shown in FIG. 5, except that no simulating optics are shown before the detector 124, and a processor with simulation control programming 132 is instead included. It is noted that the processor 132 preferably performs many other control functions in the system, as does a processor (not shown) in the system of FIG. 5. The processor 132 is shown in FIG. 6 and not in FIG. 5 to accent the contribution of the processor 132 to the implementation of the present invention in the alternative embodiment of FIG. 6.

The detector 124 outputs a signal to the processor 132. The processor then configures the data received from the detector 124 using simulation control software. The simulation control software modifies the data received from the detector 124 to simulate the effects of the beam transforming optics 120 on the output beam 114. The modified data is then representative of the transformed output beam 118. For example, detector 124 could be a detector array, segmented detector, or CCD camera. If an aperture in the output beam 114 blocks the outer diameter of the beam, then detector 124 would provide power/energy information for various portions of the diagnostic beam 111, and the software would preclude the outer portion of the diagnostic beam (corresponding to the outer portion of the output beam 114 blocked by the aperture) from being included in the power measurement.

The simulation control software takes into account the effects described above such as the induced absorption, the beam collimating and aperturing effects of any lens, and any lens apertures that may be included in the beam transforming optics 120. The output from the processor 132 to the A/D converter 126 then simulates the output corresponding to the transformed diagnostic beam 122 of the simulating optics 116 of the preferred embodiment of FIG. 5. Once again, the operating voltage is advantageously adjusted based on the signal from processor 132 (which corresponds to the transformed output beam 118) to more accurately control the energy of the transformed output beam 118, wherein it is more important to control the energy of the transformed output beam 118 than the output beam 114 before it has been transformed by the beam transforming optics 120.

Those skilled in the art will appreciate that the above disclosed preferred embodiments are subject to numerous adaptations and modifications without departing from the scope and spirit of the invention. Therefore, it is to be understood that, within the scope and spirit of the invention, the invention may be practiced other than as specifically described above. For example, the detector 24 can measure any beam parameter of the diagnostic beam 22, including energy, energy stability, bandwidth, wavelength, beam profile, pulse shape, pulse duration, pulse stability, temporal pulse width, temporal coherence, spatial coherence, amplified spontaneous emission (ASE), discharge width, and long and short axial beam profiles and divergences, and/or any combination thereof, whereby the laser can be controlled for optimal performance based upon any of the monitored beam parameters. Moreover, any of these beam parameters can be transformed by beam transforming optics 120, which would be compensated for by simulating optics 116 or process simulation controller 132. The simulating optics 116 and beam transforming optics 120 can include any optical element that changes any aspect, characteristic, or parameter of the beams, including lenses, apertures, gratings, mirrors, etc. Further, the signal from the A/D converter 26 can be used to control a gas replenishment module 140 (see FIGS. 5–6), which is a well known device in the art that provides the desired pressure and mixture of gases in the laser tube through periodic gas injections and venting. In addition, while the beam transforming optics and simulating optics have been discussed in the plural, it is within the scope of the present invention to use as few as a single optic to transform any of the above listed beam parameters in beams 114 and 111. Lastly, the beam transforming optics could be part of a beam delivery system for directing the output beam to the workpiece, and the transformations caused thereby, and compensated for by the present invention, may be unavoidable and/or unintentional.

What is claimed is:

1. A laser system, comprising:
a gain medium disposed in a resonant cavity;
discharge electrodes;
a power supply connected to the discharge electrodes for exciting the gain medium to produce an output beam;
beam splitting means for creating a primary output beam and a diagnostic beam from the output beam;
beam transforming means for inducing a first beam parameter transformation in the primary output beam;
beam simulation means for inducing a second beam parameter transformation in the diagnostic beam; and
a detector for measuring at least one of a plurality of beam parameters of the diagnostic beam after the second beam parameter transformation is induced;
wherein the first beam parameter transformation induced in the primary output beam is substantially the same as the second beam parameter transformation induced in the diagnostic beam.

2. The laser system of claim 1, further comprising:
a controller for controlling the power supply, wherein the controller modifies the excitation of the gain medium by the power supply in response to the at least one beam parameter measured by the detector.

3. The laser system of claim 2, further comprising:
a laser tube for containing the gain medium, wherein the gain medium is gaseous; and
a gas replenishment module controlled by the controller and connected to the laser tube for adding and withdrawing gas to the gain medium;
wherein the controller modifies the gas added to and withdrawn from the gain medium in the laser tube by the gas replenishment module in response to the at least one beam parameter measured by the detector.

4. The laser system of claim 2, wherein the first beam parameter transformation includes transforming at least one of a beam profile, a beam divergence, a pulse shape, a pulse duration, a temporal pulse width, a temporal coherence, and a spatial coherence of the primary output beam.

5. The laser system of claim 4, wherein:
the beam transforming means includes a first plurality of optical elements; and
the beam simulating means includes a second plurality of optical elements that is substantially identical to the first plurality of optical elements.

6. The laser system of claim 2, wherein the beam transforming means and the beam simulation means both include an aperture having a predetermined diameter.

7. The laser system of claim 2, wherein the beam transforming means and the beam simulation means both include an overfilled lens aperture.

8. The laser system of claim 2, wherein the beam transforming means and the beam simulation means both include an imaging system.

9. A laser system, comprising:
a gain medium disposed in a resonant cavity;
discharge electrodes;
a power supply connected to the discharge electrodes for exciting the gain medium to produce an output beam;
beam splitting means for creating a primary output beam and a diagnostic beam from the output beam;
beam transforming means for inducing a beam parameter transformation in the primary output beam;
a detector for measuring at least one of a plurality of beam parameters of the diagnostic beam, and for producing a signal in response to the measured at least one beam parameter;
a processor for modifying the signal to simulate in the diagnostic beam the inducing of the beam parameter transformation by the beam transforming means of the primary output beam.

10. The laser system of claim 9, further comprising:
a controller for controlling the power supply, wherein the controller modifies the excitation of the gain medium by the power supply in response to the signal modified by the processor.

11. The laser system of claim 10, further comprising:
a laser tube for containing the gain medium, wherein the gain medium is gaseous; and
a gas replenishment module controlled by the controller and connected to the laser tube for adding and withdrawing gas to the gain medium;
wherein the controller modifies the gas added to and withdrawn from the gain medium in the laser tube by the gas replenishment module in response to the signal modified by the processor.

12. The laser system of claim 10, wherein the beam parameter transformation includes transforming at least one of a beam profile, a beam divergence, a pulse shape, a pulse duration, a temporal pulse width, a temporal coherence, and a spatial coherence of the primary output beam.

13. The laser system of claim 10, wherein:
the beam transforming means includes an aperture for blocking an outer portion of the primary output beam;
the at least one beam parameter measured by the detector is the energy level of the diagnostic beam; and
the modification of the signal by the processor includes reducing the measured energy level to simulate blocking an outer portion of the diagnostic beam with the aperture.

14. The laser system of claim 10, wherein the beam transforming means includes an overfilled lens aperture and the inducement of the beam parameter transformation in the diagnostic beam includes an effect on the beam parameters of the diagnostic beam that substantially simulates an effect of the overfilled lens aperture of the beam transforming means on the beam parameters.

15. The laser system of claim 10, wherein the beam transforming means includes an imaging system and the inducement of the beam parameter transformation in the diagnostic beam includes an effect on the beam parameters of the diagnostic beam that substantially simulates an effect of the imaging system of the beam transforming means on the beam parameters.

16. A laser system for applying optical energy to a workpiece, the laser system comprising:
a gain medium disposed in a resonant cavity;
discharge electrodes;
a power supply connected to the discharge electrodes for exciting the gain medium to produce an output beam;
a beam splitter for creating a primary output beam delivered to a workpiece and a diagnostic beam from the output beam;
beam transforming elements for inducing a beam parameter transformation in the primary output beam;
beam simulation elements for inducing a beam parameter transformation in the diagnostic beam; and a detector for measuring at least one beam parameter of the diagnostic beam after the beam parameter transformation in the diagnostic beam is induced and wherein the beam simulation elements are configured so that the correspondence between chararteristics of the primary output beam as it reaches the workpiece and the diagnostic beam as it reaches the detector is improved.

17. The laser system of claim 16, further comprising:

a controller for controlling the power supply, wherein the controller modifies the excitation of the gain medium by the power supply in response to the at least one beam parameter measured by the detector.

18. The laser system of claim 17, further comprising:

a laser tube for containing the gain medium, wherein the gain medium is gaseous; and a gas replenishment module controlled by the controller and connected to the laser tube for adding and withdrawing gas to the gain medium;

wherein the controller modifies the gas added to and withdrawn from the gain medium in the laser tube by the gas replenishment module in response to the at least one beam parameter measured by the detector.

19. The laser system of claim 17, wherein the first beam parameter transformation includes transforming at least one of a beam profile, a beam divergence, a pulse shape, a pulse duration, a temporal pulse width, a temporal coherence, and a spatial coherence of the primary output beam.

20. The laser system of claim 19, wherein the beam transforming elements and the beam simulating elements are substantially identical to each other.

21. The laser system of claim 17, wherein the beam transforming elements and the beam simulation elements both include an aperture having a predetermined diameter.

22. The laser system of claim 17, wherein the beam transforming elements and the beam simulation elements both include an overfilled lens aperture.

23. The laser system of claim 17, wherein the beam transforming elements and the beam simulation elements both include an imaging system.

24. A method of stabilizing a laser system comprising the steps of:

exciting a gain medium in a resonant cavity to generate an output beam;

splitting the output beam into a primary output beam and a diagnostic beam;

inducing a first beam parameter transformation in the primary output beam;

inducing a second beam parameter transformation in the diagnostic beam; and measuring at least one of a plurality of beam parameters of the diagnostic beam after the second beam parameter transformation is induced, wherein the first beam parameter transformation induced in the primary output beam is substantially the same as the second beam parameter transformation induced in the diagnostic beam; and modifying the excitation of the gain medium in response to the at least one measured beam parameter.

25. A method of stabilizing a laser system comprising the steps of:

exciting a gain medium in a resonant cavity to generate an output beam;

splitting the output beam into a primary output beam and a diagnostic beam;

inducing a beam parameter transformation in the primary output beam;

measuring at least one of a plurality of beam parameters of the diagnostic beam;

producing a signal in response to the measured at least one beam parameter;

modifying the signal to simulate in the diagnostic beam the inducing of the beam parameter transformation by the beam transforming means of the primary output beam; and modifying the excitation of the gain medium in response to the modified signal.

26. A method of stabilizing a laser system comprising the steps of:

exciting a gain medium in a resonant cavity to generate an output beam;

splitting the output beam into a primary output beam delivered to a workpiece and a diagnostic beam;

inducing a beam parameter transformation in the primary output beam;

inducing a beam parameter transformation in the diagnostic beam;

measuring at least one beam parameter of the diagnostic beam after the beam parameter transformation is induced therein, wherein the induction of the diagnostic beam parameter transformation is performed so that a correspondence between characteristics of the primary output beam as it reaches the workpiece and the diagnostic beam as it is measured is improved; and modifying the excitation of the gain medium in response to the measured beam parameter.

* * * * *